United States Patent Office 3,427,919
Patented Feb. 18, 1969

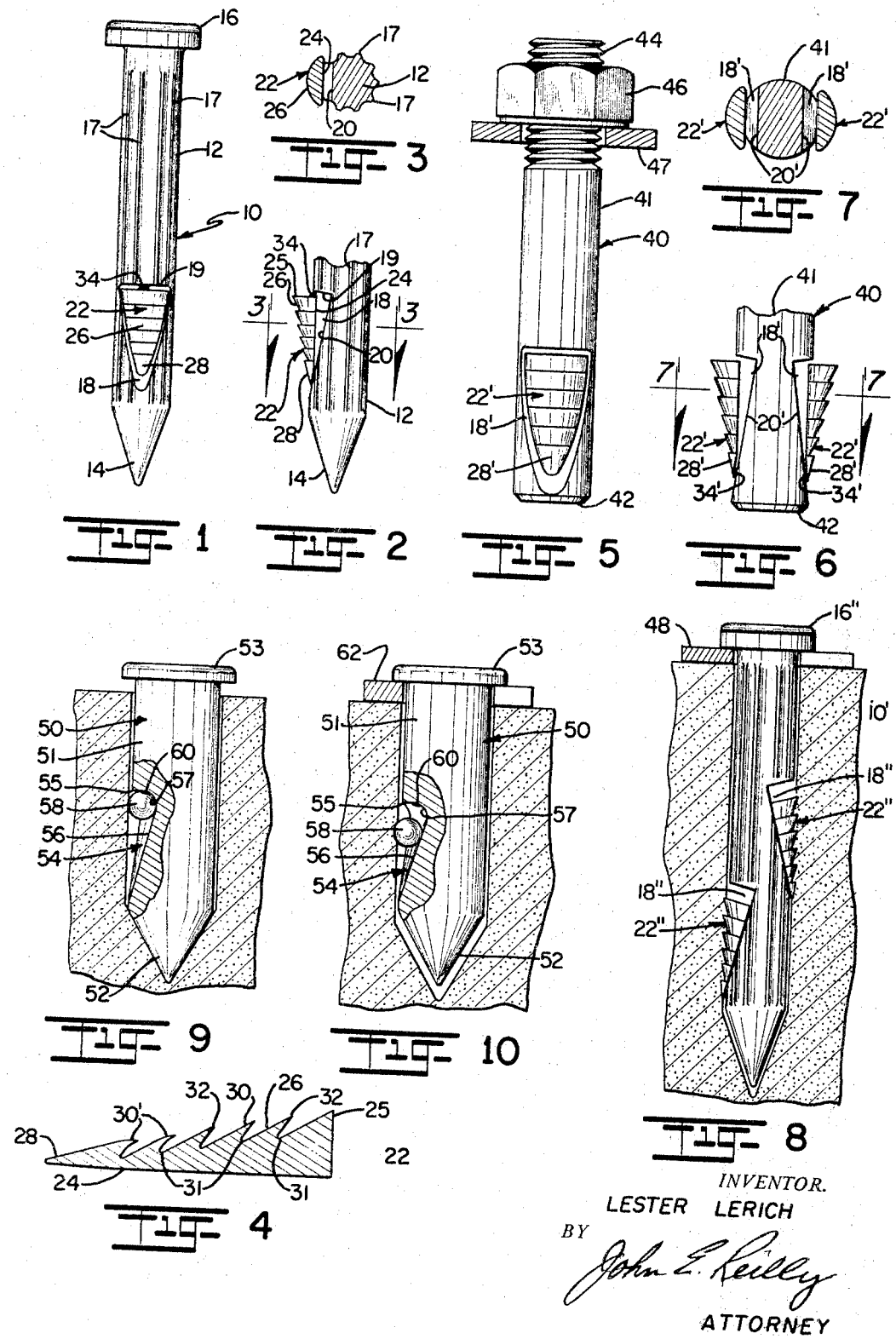

3,427,919
WEDGE EXPANSION DEVICE
Lester Lerich, Lakewood, Colo., assignor to Wej-It Expansion Products, Inc., Broomfield, Colo., a corporation of Delaware
Filed June 7, 1966, Ser. No. 555,720
U.S. Cl. 85—72          10 Claims
Int. Cl. F16b *13/04, 33/04*

ABSTRACT OF THE DISCLOSURE

An anchor bolt has one or more wedge members aligned with recesses on the bolt, and each wedge member is temporarily secured in outwardly spaced relation to its recess by a frangible joint, the latter being broken by engagement of the wedge with the wall of the hole in which it is inserted so that the wedge is displaceable outwardly into anchored engagement within the hole.

---

This invention relates to novel and improved fastening devices and more particularly relates to a wedge-type expansion bolt being so constructed as to facilitate assembly and subsequent installation into firmly anchored relation within a blind hole.

It is an object of the present invention to provide for a novel and improved fastening device adapted for use in establishing anchored relation within a blind hole formed in masonry, concrete and other hard materials; and more specifically to provide an anchor bolt of simple and durable construction which is adaptable for insertion into holes approximating the diameter of the bolt and which incorporates a novel and improved form of wedge expansion means to establish collapisble but firm wedging engagement with the wall of the hole and specifically in such a way as to provide a definite indication of the pullout strength of the bolt once anchored.

It is a further object of the present invention to provide a novel and improved manner and means for releasably connecting one or more wedge expansion members in aligned relation to complementary wedge-receiving grooves on the external surface of a bolt and which upon insertion into a hole is broken to permit release of the wedge expansion members for subsequent displacement into positive anchored relation within the hole.

It is an additional object of the present invention to provide for a novel combination and arrangement between a bolt member characterized by having a pointed or tapered end, wedge expansion members on the bolt to collapsibly but wedgingly engage the wall of a hole and a frangible joint detachably connecting the wedge expansion members and bolt to prevent loss or misalignment of the wedge members in shipment and prior to or during installation within a hole.

The above and other objects, advantages and features of the present invention will become more readily appreciated and understood from a consideration of the following detailed description of alternate forms of the present invention when taken together with the accompanying drawings, in which:

FIGURE 1 is a front view of one form of anchor bolt with the parts shown in assembled relation prior to insertion in a hole.

FIGURE 2 is a side view of the inner end of the bolt shown in FIGURE 1.

FIGURE 3 is a sectional view taken about line 3—3 of FIGURE 2.

FIGURE 4 is an enlarged, cross-sectional view through the wedge expansion member illustrated in FIGURES 1 to 3 when anchored in a hole.

FIGURE 5 is a front view of a modified form of bolt member.

FIGURE 6 is a side view of the inner end of the bolt member shown in FIGURE 5.

FIGURE 7 is a sectional view taken about line 7—7 of FIGURE 6.

FIGURE 8 is a view of another form of bolt with the wedge expansion member in offset relation on the bolt, the bolt being illustrated in anchored relation within a hole.

FIGURE 9 is a view of still another modified form of bolt; and

FIGURE 10 is a view of the bolt shown in FIGURE 9 in anchored relation within a hole.

Referring in more detail to the drawings, in the form of invention shown in FIGURES 1 to 3 an anchor bolt 10 takes the form of a stud or nail-type fastener having a narrow elongated shank portion 12 terminating in a tapered or pointed leading end 14 and being suitably provided with an enlarged head 16 at its outer end. The external surface of the shank 12 is fluted to define circumferentially spaced longitudinally extending ridges 17; and a relatively deep, wedge-receiving forwardly tapered recess or groove 18 is formed in the external surface of the shank in spaced relation rearwardly of the leading end, the groove having an undercut shoulder portion 19 and a bearing surface 20 inclining outwardly from the deeper portion of the groove toward the leading end.

A tapered wedge expansion member 22 is dimensioned to be complementary to the groove and to the external surface of the shank, and to this end is formed with an inner flat surface 24 slidable along the inclined bearing surface 20, a relatively thick trailing end 25 directed outwardly from the inner surface 24 complementary to that of the shoulder 19, and an arcuate external surface 26 tapers forwardly in width and thickness from the trailing end 25 and terminates in a relatively sharp, thin leading end 28.

The wedge expansion member is characterized in particular by having circumferentially extending serrations 30 separated by rounded undercut grooves 31 at spaced intervals along the external surface 26, as best seen from FIGURE 4. Preferably, each serration is directed rearwardly and outwardly at a relatively low angle from the external surface and is extremely thin and tapered in cross section to terminate in sharp terminal edges 32. Because of the increasing width and thickness of the wedge rearwardly from its leading end 28, each serration will be of increased strength in rearward progression from the leading end. In this way, as the wedge is displaced into wedging engagement with the wall of a hole, each of the serrations in succession may be placed under sufficient compression against the surrounding wall to bend or collapse inwardly; and, as each serration increases in width and thickness it will exhibit more resistance and accordingly require increased pressure or force to be collapsed. As each successive serration is collapsed there will be of course a slight give or yielding in the bolt to provide a definite indication when wedged to the point of collapse. By gauging the amount of force required to collapse each serration in succession, it is possible to indicate in a more definite manner to the user the amount of pull-out or displacement force required to securely anchor a bolt in a given material. Stated in another way, the wedging force may be expressed in terms of the number of serrations collapsed when the bolt is displaced in a rearward direction with respect to the hole and thus provide a more positive indication of a good safe anchor.

Another feature of the present invention resides in the manner of detachable connection of the wedge expansion member 22 in aligned relation to the groove 18, this being accomplished by a frangible joint 34 formed in a limited or localized area preferably between the thicker, intermediate portion of the trailing end 25 of the wedge and the shoulder 19. Thus the joint may be formed by a localized or spot-connection composed of a low melting point soldering compound, or composed of an adhesive, such as, an epoxy resin. Further, it is advantageous to connect the wedge in spaced relation to the inner bearing surface 20 so that upon insertion into a hole approximately the diameter of the bolt the wedge will be immediately engaged by the surrounding wall of the hole and forced inwardly to break the connection. Once inserted, the wedge member is then free to slide in a forward and outward radial direction along the inclined bearing surface 20 as the bolt as displaced in a rearward direction. In advancing outwardly with respect to the groove 18 the leading end of the wedge will establish initial wedging engagement with the wall and under continued displacement will be collapsed or bent inwardly as indicated at 30' in FIGURE 4. As the pull-out force is continually increased to displace the wedge member forwardly along the groove, each next serration in succession will have a tendency to collapse under sufficient wedging pressure. A definite feeling of release or yield in the bolt will be reflected each time that a serration is collapsed to provide a definite indication of the number of collapsements in response to an applied force. Accordingly, the user can determine exactly how much force to apply by the number of collapsements felt as the bolt is displaced rearwardly from the hole. In the form of invention shown in FIGURES 1 to 3, the bolt is designed so that it can be driven at least part or all of the way into the member to be anchored. For example. the hole can be drilled to a depth less than the length of the bolt and the tapered end driven the remaining distance beyond the end of the drilled hole to seat itself firmly within the member; or the bolt can be driven into holes that are slightly less than the shank diameter of the bolt.

In FIGURES 5 to 7, the anchor bolt 40 takes the form of an elongated shank 41 of uniform diameter having a leading end portion 42 squared to the longitudinal axis of the bolt and an external threaded end portion 44. In this form, a pair of wedge expansion members 22' corresponding to the wedge expansion member 22 illustrated and described in FIGURES 1 to 3 are positioned in diametrically opposed wedge-receiving grooves 18'. An adhesive or solder type frangible joint 34' is placed between the tip ends 28' and the inclined surface portions 20' to connect the wedge members in aligned, outer spaced relation to the grooves 18'. During insertion into a hole approximating the diameter of the bolt, again the joints 34' are broken and the wedges are receded into the groove. When the bolt is inserted to the desired depth, a nut 46 is advanced forwardly along the threaded end 44 to force the washer 47 into contact with the external surface surrounding the hole and is tightened to cause rearward displacement of the bolt shank in relation to the hole. Under rearward displacement, as in the form of invention shown in FIGURES 1 to 3, the wedges are advanced along the inclined bearing surfaces into wedging engagement with the wall of the hole; and under increased tightening one or more serrations on each of the wedge members will be collapsed inwardly according to the wedging force desired.

In the modified form shown in FIGURE 8, an anchor bolt 10' corresponding to the bolt 10 in FIGURES 1 to 3 is provided with a pair of wedge expansion members 22' positioned in longitudinally offset, wedge-receiving grooves 18' on opposite sides of the bolt. The bolt is illustrated in inserted relation within the hole with the wedge members forced into wedging engagement to cause partial collapse or bending of the serrations. This form of bolt affords the additional advantage of more uniform wedging engagement at spaced intervals within the hole in further cooperation with the pointed end to minimize any possible lateral shifting of the bolt. According to the amount of displacement required, one or more split washer elements 48 can be placed between the undersurface of the enlarged head 16" and the external surface of the material in order to anchor and fasten the bolt firmly in place.

In the form of invention shown in FIGURES 9 and 10 a bolt 50 has a shank 51 of uniform diameter with a smooth external surface portion terminating in a leading, tapered end portion 52 and an external, enlarged head 53 at the outer end. A wedge-receiving recess 54 is located toward the inner end of the shank portion to form a shoulder portion 55 and a bearing surface 56 inclining outwardly in a radial direction from the inner rounded recess surface 57. A ball-shaped or spherical wedge expansion member 58 is positioned in the recess and is temporarily joined to the shoulder surface 55 by an adhesive or solder type frangible joint designated at 60, In use, the joint 60 is broken either as the bolt is inserted into the hole or upon rearward displacement. When displaced rearwardly, the ball-shaped member, being in contact with the wall of the hole will roll forwardly along the bearing surface 56 to anchor the bolt within the hole. As in the form of invention shown in FIGURES 1 to 3 and in FIGURE 8, one or more split washers 62 can be inserted behind the head to prevent accidental loosening of the bolt.

From the foregoing, an anchor bolt of simple and durable construction is provided which combines the advantages of being conformable for use in different types of material including masonry or concrete as well as members composed of other hard materials, such as for example, metal or wood. The rivet or nail-type fastener will provide an additional bearing surface at the leading end and permit the wedge members to be positioned a greater distance rearwardly of the leading end; or can be offset as illustrated in FIGURE 8 for more uniform wedging engagement within the hole. The positive but releasable connection afforded by the frangible joint facilitates both assembly and alignment of the wedges in proper relation to the grooves. In this relation it will be further evident that the location of the joint may be varied, and that the joint can be effectively used in combination with other specific forms of anchor bolts and wedge members.

It is therefore to be understood that various changes and modifications may be made in the construction and arrangement of parts as well as the intended application of the different forms of invention herein described without departing from the spirit and scope of the present invention, as defined by the appended claims and reasonable equivalents thereof.

What is claimed is:

1. An expansion bolt comprising a shank portion adapted for lengthwise insertion into a hole substantially corresponding to the diameter of said shank, said shank including a wedge-receiving lateral groove on its external surface with the groove having an inclined bearing surface diverging forwardly toward the leading end of said shank portion, a wedge member aligned with the groove to contact the wall of the hole and advance forwardly along the inclined bearing surface of the groove into wedging engagement with the wall of the hole upon displacement of said shank portion in a direction rearwardly of the opening, and a frangible joint detachably connecting said wedge member in aligned but outwardly protruding and radially outwardly spaced relation to the groove, said frangible joint being broken upon engagement by the external surface of said wedge member with the wall of the hole so that upon rearward displacement of said shank portion said wedge member is free to advance forwardly along the inclined bearing surface into wedging engagement within the hole.

2. An expansion bolt according to claim 1, said frangible joint being further characterized by spot-connecting said wedge to a surface portion of the groove with the wedge disposed in outward radial spaced relation to the groove.

3. An expansion bolt according to claim 1, said frangible joint being composed of a soldering compound being spot-connected between a shoulder surface on the groove and the trailing end of said wedge member.

4. An expansion bolt according to claim 1, said frangible joint being defined by an adhesive being connected in a localized area between a shoulder surface on the groove and trailing end of said wedge member.

5. An expansion bolt having an elongated bolt shank terminating in a forwardly tapered leading end portion, the shank being adapted for lengthwise insertion into a hole approximating the diameter of the shank, a wedge-receiving lateral groove on the external surface of the shank rearwardly of said forward tapered end, the groove having an inclined bearing surface diverging forwardly from a shoulder at the relatively deep end of the groove, a wedge member being aligned with the groove including a flat inner surface slidable along the inclined bearing surface and an external surface complementary to the external surface of the shank portion, said wedge member being adapted for engagement with the wall of the hole and for forward advancement along the inclined bearing surface of the groove into wedging engagement with the wall of the hole upon displacement of said shank portion in a direction rearwardly of the hole, and a frangible joint detachably interconnecting said wedge member in aligned but radially outwardly spaced relation to the groove, said frangible joint being weakened to fracture upon engagement with the wall of the hole to permit forward advancement of said wedge member along the inclined bearing surface of the groove upon displacement of said bolt shank in a direction rearwardly of the hole.

6. An expansion bolt according to claim 5, further characterized by including a pair of wedge-receiving lateral grooves in diametrically opposed relation to one another on the external surface of said shank portion, a complementary wedge member for each of the grooves and a frangible joint between each of said wedge members and its respective groove.

7. An expansion bolt according to claim 6, of the grooves being in diametrically opposed, longitudinally offset relation on opposite sides of the shank portion.

8. An expansion bolt according to claim 5, further including a frangible joint detachably connecting said wedge member at a localized area to the surface of the groove.

9. An expansion bolt according to claim 8, said frangible joint being connected between the leading ends of said wedge member and the groove.

10. An expansion joint according to claim 8, said frangible joint being spot-connected between the trailing end of said wedge member and a shoulder portion of the groove.

References Cited
UNITED STATES PATENTS

| | | | |
|---|---|---|---|
| 706,071 | 8/1902 | La Bauve | 85—51 |
| 799,298 | 9/1905 | Bond | 85—23 |
| 1,110,797 | 9/1914 | Knox | 85—79 |
| 1,238,423 | 8/1917 | Matthey | 85—5 |
| 1,493,089 | 5/1924 | Walker | 85—51 |
| 2,120,577 | 6/1938 | Schulte | 85—75 |
| 2,231,068 | 2/1941 | Harrington | 85—79 |
| 2,362,969 | 11/1944 | Boelter | 85—79 |
| 2,774,273 | 12/1956 | Olson | 85—79 |

FOREIGN PATENTS

| | | |
|---|---|---|
| 175,127 | 2/1922 | Great Britain. |
| 742,280 | 12/1955 | Great Britain. |
| 809,987 | 3/1959 | Great Britain. |

EDWARD C. ALLEN, *Primary Examiner.*

U.S. Cl. X.R.

85—79